United States Patent [19]

Meyers et al.

[11] 4,451,119
[45] May 29, 1984

[54] COMPOSITE MIRROR AND METHOD OF CONSTRUCTION

[75] Inventors: John J. Meyers, Penfield; John C. Pulver, Spencerport, both of N.Y.

[73] Assignee: Eastman Kodak Company, Rochester, N.Y.

[21] Appl. No.: 250,475

[22] Filed: Apr. 2, 1981

[51] Int. Cl.³ .............................................. G02B 5/08
[52] U.S. Cl. ............................................... 350/310
[58] Field of Search ...................... 350/310, 320, 288; 139/420 G

[56] References Cited

U.S. PATENT DOCUMENTS

| | | | |
|---|---|---|---|
| 3,925,587 | 12/1975 | Park | 139/420 R X |
| 4,035,065 | 7/1977 | Fletcher | 350/320 X |
| 4,256,378 | 3/1981 | Prewo et al. | 350/310 |
| 4,268,124 | 5/1981 | Lui | 350/310 |
| 4,271,570 | 6/1981 | Curzio | 139/420 R X |

Primary Examiner—F. L. Evans
Attorney, Agent, or Firm—John A. Morrow

[57] ABSTRACT

A preferred embodiment of a composite mirror comprises (1) a substrate of carbon-carbon, (2) intermediate layers of silicon carbide, silicon dioxide, (3) optically polished layers of metals and/or suitable glass (ultra-low-expansion or modified fused-silica glass) and (4) an optical coating of high reflectivity. The resulting mirror exhibits desired features including high optical quality and a low coefficient of thermal expansion; such mirrors being well suited to high thermal flux applications. Methods of producing the composite mirror are described.

13 Claims, 1 Drawing Figure

COMPOSITE MIRROR AND METHOD OF CONSTRUCTION

BACKGROUND OF THE INVENTION

1. Field of the Invention

The present invention relates to mirrors suitable for high thermal energy applications such as laser mirrors and more specifically to composite mirrors of high optical quality having a carbon-carbon substrate.

2. Description of the Prior Art

Mirrors for space and airborne high-energy laser systems and for space surveillance systems must satisfy exceptional weight and stability requirements. Such mirrors must be thermally stable, polishable to precise optical surface tolerances, and free of long-term dimensional changes resulting from exposure to thermal cycling, moisture, and low pressure.

Desired properties of laser mirrors are discussed in an article by Albert Slomba entitled, "Laser Mirror Requirements" in the Optical Industry and Systems Purchasing Directory, 1980 (26th ed.) Book 1, pages B-487 and B-488, by the Publishers of *Optical Spectra* Magazine. As described in this article, a large number of materials have been considered as candidates for mirror substrates in view of demonstrated thermal and mechanical characteristics. Among the glasses which have been used for mirror substrates are fused silica, ultra-low-expansion glasses, and ceramic-vitreous materials. Metals considered have included aluminum, copper, beryllium, molybdenum, and their alloys. There is no suggestion in the article that carbon-carbon materials have been used as mirror substrates or have been previously considered for such a use.

U.S. Pat. Nos. 3,841,737 and 4,074,416 disclose composite mirrors suitable for laser applications. Such mirrors comprise substrates selected from temperature-stable metals, such as nickel alloys, which are coated with an intermediate layer of tungsten carbide or other heat-resistant material before being plated with a reflecting surface of metal. While such mirrors are composites of selected materials, there is no suggestion of the use of the carbon-carbon materials and methods of production of mirrors of the present invention.

U.S. Pat. No. 4,142,006 and 4,214,818 disclose methods of making high-power laser mirrors using a refractory composition substrate comprising silicon carbide, silicon nitride and mixtures thereof, which is hot pressed and then polished to an optical surface before overcoating with a film of high reflectivity metal. Because the surface specularity of these mirrors is not considered to be of high enough quality for high energy laser applications, it has been suggested that chemical vapor deposition may be used to produce layers of silicon carbide on the hot pressed substrate prior to application of the high reflectivity metal. However, there is no suggestion of the use of carbon-carbon materials as a substrate material.

Carbon-carbon composite material has been widely used for rocket nozzles and ablative shields on re-entry spacecraft. Features of carbon-carbon material are described in U.S. Pat. Nos. 4,198,382; 4,212,906; and 4,225,569, for example. In general, carbon-carbon material comprises a multi-dimensional weave of high-strength carbon fiber bundles with the interstitial spaces initially filled with resins. The material is before use as a mirror substrate fused under pressure and high temperature, to carbonization of both the fiber bundles and the resins such that the resultant carbon-carbon material is a composite material essentially absent any residual resinous material. As described in U.S. Pat. No. 4,225,569 at Column 3, line 30 and following, the carbon-carbon composite material thus prepared is a structure which appears to be a completely unitary body of uniform quality in which the fibrous reinforcing carbon is completely integrated with the matrix carbon. Commercially available carbon-carbon materials have a generally fibrous surface instead of a desired specular surface suitable for successful application and implementation of known reflective optical coatings.

The use of woven graphite-epoxy as a supportive bezel with ultra-lightweight mirrors of fused silica glass has been disclosed in an article by John W. Pepi and Richard J. Wollensak entitled "Ultra-Lightweight Fused Silica Mirrors for a Cryogenic Space Optical System", published in the *Proceedings of Photo-Optical Instrumentation Engineers*, Volume 183 (Space Optics), 1979, pages 131-138. The woven graphite-epoxy was chosen for the supportive bezel because of its light weight, thermal stiffness, and stable characteristics. The thermal characteristics of the bezel and mirror were closely matched. The article did not suggest application of the fused silica glass to a substrate comprising a woven graphite-epoxy substrate or carbon-carbon material.

Composite mirrors, in accordance with the present invention, comprise a coating of high reflectivity supported by a carbon-carbon substrate. Such mirrors are suitable for environments in which they are subjected to relatively large thermal transients or gradients. A presently preferred embodiment of a composite mirror comprises a carbon-carbon substrate coated with an intermediate layer of silicon carbide to bond an optically reflective coating to the carbon-carbon substrate. An additional bonding layer of silicon dioxide may be provided by oxidizing the silicon carbide prior to application of the reflective coating.

BRIEF DESCRIPTION OF THE DRAWING

The single FIGURE in the drawing illustrates a composite mirror constructed in accordance with the present invention.

DESCRIPTION OF THE PREFERRED EMBODIMENT

Figure 1:
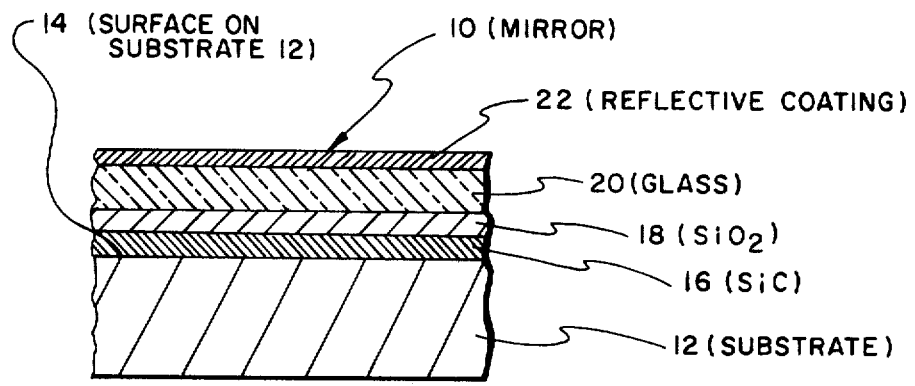

Referring now to the drawing, there is illustrated a presently preferred embodiment of a mirror 10 comprising a substrate 12 of carbon-carbon material. Surface 14 of the substrate 12 is prepared to provide desired characteristics prior to application of a coating of silicon carbide 16. An intermediate layer of silicon dioxide 18 supports a glass layer 20 which is coated with a highly reflective coating 22. The thicknesses of each of the component layers illustrated in the drawing is not to scale. The thicknesses may vary widely in accordance with requirements to be met by mirrors constructed in accordance with our invention.

To assist in an understanding of the present invention, each of the component layers will now be described in greater detail.

CARBON-CARBON SUBSTRATE

Known carbon-carbon composite materials possess desired attributes of mirror substrates including a high modulus of elasticity (up to $6.9 \times 10^6$ N/cm$^2$), high thermal conductivity (up to 0.42 gm-cal/cm-sec-°C.), high tensile strength ($5.5 \times 10^3$ N/cm$^2$), a low coefficient of thermal expansion, and good environmental stability. However, commercially-available carbon-carbon materials have a generally porous and/or fibrous surface.

In the absence of known carbon-carbon material having a desired specular surface finish for use as a mirror substrate, we have successfully developed suitable composite mirrors by preparing surface 14 of commercially-available carbon-carbon materials to support alternative surface materials which provide a specular surface. Although our experiences have primarily been limited to three-dimensional (3-D woven) carbon-carbon materials, our findings apply to other alternative carbon-carbon materials such as those having multi-weave patterns and those having a chopped carbon fiber matrix surface. Therefore as used herein, we intend the term carbon-carbon to generically include woven carbon-carbon materials as well as those prepared from a matrix or any desired combination of a weave and a matrix. The carbon-carbon materials are composite materials essentially absent any residual resinous material and appear to be a completely unitary body in which any fibrous reinforcing carbon is completely integrated with the matrix carbon. Other attributes of such known carbon-carbon composite materials are described in the preceding paragraph.

SILICON CARBIDE LAYER

The use of silicon carbide and other refractory materials as intermediate layers in a composite mirror is previously known from U.S. Pat. No. 4,142,006, for example. It is further known that a sputtered or chemically vapor reacted layer of silicon carbide deposited onto the surface of hot pressed silicon carbide or other suitable substrate may be polished to a good optical finish. However, the required surface specularity for extremely high quality optical surfaces cannot be achieved because the deposit replicates the substrate. With the carbon-carbon substrate of our invention, we have found that better quality mirrors can be made by employing a silicon carbide intermediate bonding layer to adhere an applied metal and/or a glass reflecting layer to the substrate.

Conventional chemical vapor reactions using high reaction temperatures may be used to deposit a silicon carbide layer 16 on surface 14 of the carbon-carbon substrate 12. Exceptional care must be taken when using chemical vapor reactions to not reopen cracks or cause thermal degradation of the carbon-carbon substrate. However, as will be described, we have successfully employed a high temperature chemical vapor reaction to apply metals or glass to carbon-carbon substrates. The structure of silicon carbide formed by chemical vapor reaction is of crystalline nature and is generally thicker (about $3 \times 10^{-3}$ cm) while that formed by sputtering is amorphous and very thin (about 2000 Angstroms). We have learned that metals adhere best to a crystalline structure while glasses will adhere to either crystalline or amorphous structures.

Because high temperatures are not required to apply silicon carbide by conventional sputtering techniques, it is preferable to use these sputtering techniques whenever possible. Additionally, sputtering techniques provide positive control of the process parameters and the deposited thickness of silicon carbide. We have successfully employed an RF sputtering process to form the intermediate bonding layer for adhering either metals or glass to the carbon-carbon substrate. It is possible with either the chemical vapor reaction process or the sputtering process to improve the entire surface character by partially filling and/or bridging fine residual cracks in the carbon-carbon substrate with the silicon carbide.

In one embodiment, prior to sputtering of silicon carbide to the prepared substrate surface, the surface of the substrate is sputter-etched for 5 to 10 minutes. The parameters for sputtering silicon carbide are generally well known and in many cases vary as a function of size of the substrate. General parametric ranges which we have found to be suitable include:

| | |
|---|---|
| Type: | RF Power source at 13.56 megacycles |
| Target to substrate spacing: | 5 to 15 cm |
| Cathode (target) input power: | 3 to 6 w/cm$^2$ (based on target area) |
| Voltage gradient to ground: | 2200 volts |
| Pressure atmosphere: | $2.0 \times 10^{-5}$ kPa Argon (with magnetron cathode) $1 \times 10^{-3}$ kPa Argon (with diode mode cathode) |
| Deposition Rate: | 0.02 Microns/hour |

SILICON DIOXIDE LAYER

In most instances a layer of silicon dioxide applied between the silicon carbide substrate and an applied metal or glass reflecting layer provided an improved and very adherent bond. When desired, the silicon carbide can be oxidized to form a layer of silicon dioxide prior to coating of the reflecting layer.

Following coating of the silicon carbide layer 16 on the substrate 12, the layer may be exposed to an atmosphere of oxygen to form a layer of silicon dioxide 16. We have learned that the silicon carbide surface may be cleaned advantageously with hydrofluoric acid prior to oxidation. Such cleaning of the silicon carbide surface may be desirable to remove surface impurities which may be present and to enhance the quality of the oxidized surface.

GLASS LAYER

As previously described, the use of glass as a high quality and specular optical mirror substrate is known in the prior art. In practicing our invention, we have successfully applied Schott #8329 Glass (available from Schott Optical Glass, Inc., of Duryea, Pa.) by an evaporative coating process or Corning Grade #7971 Glass (an Ultra-Low-Expansion Glass available from Corning Glass Works, of Corning, N.Y.) by an RF sputtering process. As is known conventionally, it is advantageous to use a surface of applied glass 20 to support an optical reflecting surface 22. We have found it suitable to apply the glass by RF sputtering, ion-plating, and evaporation techniques. The glasses coated onto the substrate in such a manner provide desired optical figure and specularity characteristics for supporting optical reflecting coatings. As is desired, the thermal coefficient of expansion characteristics of the applied glasses are reasonably matched to the carbon-carbon substrate.

Features of the ultralow-expansion modified fused-silica glasses are known in the art and have been described more fully in an article entitled "A New Ultralow-Expansion Modified Fused-Silica Glass", by C. L. Rathmann, G. H. Mann, and M. E. Nordberg in *Applied Optics*, May, 1968, pages 819–823. A further discussion of the attributes of Corning's Grade 7971 Glass as a substrate for a space telescope mirror is described in an article by William C. Lewis entitled "Space Telescope Mirror Substrate", published in the *Proceedings of Photo-Optical Instrumentation Engineers*, Vol. 183 (Space Optics), 1979, pages 114–117.

One test of stability of the glass coated onto a substrate involves evaluating the degree of adherence of the glass to the surface of the substrate. Excellent adherence has been found in mirrors wherein the silicon carbide/silicon dioxide was applied to the carbon-carbon surface. It is believed that strong chemical bonds have been achieved as evidenced by the fact that sputtered ultralow-expansion glass coated specimens withstand repeated thermal shocks encountered when heated to 260° C., immediately plunged into liquid nitrogen (−196° C.), and then immersed into warm water. Following these thermal shock cycles the coated surface of the samples withstand tape-pull testing without failure of the coating bonds. As further proof of the strong bonds, many samples have withstood very high intrinsic compressive stresses introduced during the sputtered ultralow-expansion glass coating process.

POLISHING COATED GLASS

When a reasonably high quality carbon-carbon substrate surface is employed, excellent optical specularity results from polished surfaces of Schott #8329 glass or Corning #7971 ultralow-expansion glass. At 1000× magnification, no pinhole defects are detectable. Pinholes and cracks in the carbon-carbon, up to roughly five (5) Microns in diameter or width, were filled or bridged with the glass. Many defects in a coating caused by larger voids in the carbon substrate were filled by polishing the first ultralow-expansion glass coating and then re-applying and polishing a second coating. In fact, this technique was also successfully used to overcoat some cracks discovered in the initial coating of a sample sputtered with ultralow-expansion glass, without cracks occurring in the second overcoat of the sputtered ultralow-expansion glass. This technique can be employed for surface repairs.

Polishing parameters which must be considered for polising the glass on carbon-carbon include the method for blocking, the type of polish lap, types of polish abrasive, polish loads and speeds, and unblocking procedures. The polishing parameters must carefully consider interface stress levels and sample thermal/mechanical distortion. Optical surface irregularity characteristics are also influenced and controlled by these parameters. Of greater significance, however, is the intrinsic stress level introduced in the glass coating prior to polishing and the thickness and strength properties of the carbon-carbon substrate. As the glass coating is removed during the polishing process, the net bending force on the substrate will change, which results in changes to the optical figure. The amount of change is also governed by the modulus and thickness of the substrate. For example, in small size (2.5 cm diameter), thin (0.2 cm), low modulus ($1.4 \times 10^6$ N/cm$^2$) samples, changes in the surface irregularity of twelve or more rings of optical power were observed during polishing where a sputtered ultralow-expansion glass coating had compressive stresses of about $7.6 \times 10^3$ N/cm$^2$ (abnormally high).

COATING OF HIGH REFLECTIVITY

Substrates prepared in accordance with the invention were successfully overlaid with conventional laser mirror coatings 22 of high reflectivity selected from the group comprising silver, gold and copper, for example. Since these materials may have a tendency to tarnish or react with components of the atmosphere, a transparent dielectric film may be disposed to cover the highly reflective film 22.

In high energy laser applications, alternate layers of dielectric materials are employed in stacks of precisely controlled thicknesses to provide high reflectance over specific wavelengths.

Selection of the mirror coatings and methods of application for substrates is known from prior art such as U.S. Pat. Nos. 4,093,349 and 4,142,006 With the selection and application of the coatings of high reflectivity is not, in and of itself, our total invention, application of selected coatings of high reflectivity to carbon-carbon substrates as disclosed herein is to be considered within the scope of our invention.

Since the selection of a specific coating of high reflectivity and methods of application are within the skill of the art, further discussion will not be made in the following Examples. However, it it to be understood that substrates prepared in accordance with our disclosure have been successfully coated with selected highly reflective layers using conventional methods of application. To facilitate further understanding of our invention, we will now discuss examples of specific composite mirrors which were produced having a carbon-carbon substrate.

EXAMPLES

EXAMPLE 1

In an attempt to produce a composite mirror with a conventional, commercially available carbon-carbon substrate, the selected carbon-carbon material demonstrated no visible surface cracks, had all visible surface discontinuities limited to less than 10 microns in any dimension, and had a high surface bond strength and hardness. The surface of the selected preform was then subjected to conventional optical grinding and polishing techniques without any degree of optical quality specularity being achieved. The resulting surface was not suitable for application of reflective coatings and no significant improvement was made by coating the surface with known optical coatings of high reflectivity. Problems were also encountered with adhesion of the optical coatings.

Efforts were next directed to the selection of alternate forms of carbon-carbon materials and to preparation of the surface of carbon-carbon material for coating of reflective coatings using techniques other than conventional grinding and polishing of the carbon-carbon surfaces. Both of these efforts resulted in successful production of composite mirrors described in the following Examples.

EXAMPLE 2

The carbon-carbon substrate material selected was a 3-D woven material having a surface overlay of carbon cloth filled with a chopped carbon fiber matrix blend. The materials having the matrix overlap provided a smooth surface having high surface strength. In such a material, the surface bond strength is greatly increased by increasing the percentage of "a-a" and "b-b" carbon fiber planes exposed to the surface since these planes have high strength compared to the "c-c" plane, which is very weak.

A thin ($3 \times 10^{-3}$ cm) deposit of silicon carbide 16 was applied to the surface of the carbon-carbon substrate. The silicon carbide was applied by a high temperature chemical vapor reaction process at about 1800° C. During cool-down, the silicon carbide layer was oxidized by exposure to ambient atmosphere to form a layer of silicon dioxide 18.

Electroless nickel was applied to the surface of the silicon dioxide layer 18 in a balanced nickel salt chemical bath at a temperature of about 82° C., using conventional electroplating techniques. Because of the high coefficient of thermal expansion ($14 \times 10^{-6}$ cm/cm °C.) of nickel, as compared to the carbon-carbon, a high tensile stress developed in the coating ($20.7 \times 10^3$ N/cm$^2$) when the coated substrate was cooled to room temperature. While, electroless nickel had limited covering or "throwing power" to fill holes and cracks in the carbon-carbon, the mirror produced in accordance with this example was deemed to be of acceptable quality and the coating stress produced no structural failure.

EXAMPLE 3

A substrate of the type selected in Example 2, prepared with the silicon carbide 16 and silicon dioxide 18 bonding layers, was coated with electrolytic copper, which has an excellent electroplating "throwing power". We were able to bridge holes to 20 Microns with electrolytic copper. The electrolytic copper provided a ductile coating which aids in relieving inherent coating and thermal expansion stresses. Because it is applied in a relatively cool bath (52° C.) and has a lower modulus of elasticity (0.67 times that of electroless nickel) the thermal cool-down tensile stress is measured to be about 30 percent of that measured with electroless nickel (used in Example 2), even though the coefficient of thermal expansion is approximately the same as for electroless nickel.

The electrolytic bath chemistry for applying electrolytic copper was tailored for introducing a very low tensile intrinsic plating stress (on the order of $3.45 \times 10^3$ N/cm$^2$). It is difficult to control the plating stress with electroless nickel, where the intrinsic coating stress is also tensile and of much higher magnitude.

An optimized metal coating which we prepared consisted of an electrolytic deposit of electrolytic copper about $1 \times 10^{-2}$ cm thick. Subsequently, the coating was polished to a thickness of 3.8 to $5 \times 10^{-3}$ cm. The final thickness is not critical and polishing can be stopped when specularity and surface contour requirements have been met. Specularity requirements were met by polishing with Al$_2$O$_3$ and commercial grades of Linde A and Linde B. Again, acceptable mirrors were produced in accordance with the teachings of this example.

EXAMPLE 4

An alternative carbon-carbon substrate material selected was a conventional 3-D carbon material having the exposed surface machined with a compound 45° x-y/45° z plane surface cut. This type of surface cut exposed a higher percentage of "a-a" and "b-b" carbon fiber planes, which improved the surface strength of the conventional 3-D carbon substrate. The surface of this substrate was coated with 2000 Angstroms of silicon carbide 16 and the resulting surface was subsequently oxidized to silicon dioxide 18 as in Example 2. Electroless nickel was applied (as in Example 2) to produce a mirror having desirable characteristics.

EXAMPLE 5

The alternate carbon-carbon substrate material described in Example 4 was provided with the silicon carbide 16 and silicon dioxide bonding layer 18 and then coated with electrolytic copper (as described in Example 3) to produce an acceptable mirror.

EXAMPLE 6

Samples of the alternate 45° x-y/45° z compound plane surface-cut carbon-carbon substrate material described in Example 4 were sputter coated on the cut surface with a thin (2000 Angstrom) layer of silicon carbide 16. The silicon carbide surface was subsequently oxidized to form a layer silicon dioxide 18. While remaining in the sputtering system, this surface of silicon dioxide was RF sputtered with Corning Grade #7971 ultralow-expansion glass available from the Corning Glass Works, Corning, N.Y.

The adhesion of the glass was determined to be excellent as evidenced by repeated thermal shock tests. The samples were heated to (260° C.), immediately plunged into liquid nitrogen ($-196$° C.), and then immersed into warm water. A series of tape-pull tests were then conducted to determine any possible loss of coating adhesion; no failures were experienced. The samples were next optically polished and the foregoing thermal shock and tape-pull adhesion tests were repeated. Again, no failure was noted.

To determine the optical desirability of such substrates having an applied layer of sputtered ultralow-expansion glass, a moire fringe pattern optical test was conducted to discern if any of the carbon fiber bundles would "show-through" when the samples were heated. No "show-through" was observed when the temperature was raised from 22° C. to 50° C. for a sample containing a polished ultralow-expansion glass coating of about 25 Microns in thickness.

Such application of ultralow-expansion glass by sputtering techniques was unknown and thought to be unlikely by those familiar with the art and the characteristics of ultralow-expansion glass. However, as described above, we have successfully produced composite mirrors having ultralow-expansion glass sputtered onto a prepared carbon-carbon substrate using sputtering parameters described in the following paragraphs.

We learned that excellent glass bonding could be achieved by first coating the carbon-carbon substrate with a thin (2000 Angstrom) interface layer of silicon carbide. The glass bonding is further enhanced by subsequently surface-oxidizing the silicon carbide to silicon dioxide.

The physical properties of sputtered ultra-low-expansion glass are reasonably matched with the a carbon-carbon substrate. Testing has shown that the coefficient of thermal expansion of sputtered ultra-low-expansion glass is approximately the same as most carbon-carbon materials used and ranges from $-0.40 \times 10^{-6}$ cm/cm °C. to $+0.20 \times 10^{-6}$ cm/cm °C. over a temperature range of $-25$° C. to $+175$° C. We have found that Grade #7971 Ultra-Low-Expansion Glass, available from Corning Glass Works, of Corning, N.Y. is a suitable material for production of composite mirrors by sputtering.

In the sputtering of ultra-low-expansion glass, the "intrinsic stress" level of the sputtered coating is controllable from compressive to tensile. A modest compressive level ($3.45 \times 10^3$ N/cm$^2$) counterbalances tensile loads in the glass which are first introduced when cooling to ambient temperature and subsequently added during testing and operational temperature cycling.

To maintain a manageable RF power supply (under 25 kW) and its associated matching electrical network, the larger mirror sizes (above 33 cm) can be rotated past a sputtering target. The usual arrangement, in facilitating operation and decreasing surface contamination, is to arrange the equipment for "horizontal-across" sputtering.

In operation, the carbon-carbon surface is "sputter-etch" cleaned by reversing the "cathode-anode". During this step, a mechanical-metal shutter is interposed between the cathode and anode to avoid deposition onto and contamination of the ultra-low-expansion glass target. A gradual switchover or "phase-in" process is implemented wherein the "cathode-anode" assemblies are reversed to sputter ultra-low-expansion glass from the cathode target to the anode mirror substrate.

A sputtering atmosphere of Argon gas employed for a ultra-low-expansion glass process provides ions for sputtering of the ultra-low-expansion glass. In addition, oxygen is provided to maintain the correct ultra-low-expansion glass stoichiometry. The oxygen is added because chemical dissociation of oxygen from the silicon dioxide and titanium dioxide constituents of ultra-low-expansion glass occurs and some of this oxygen is evacuated from the system through the vacuum pumps. It is also thought that in the presence of the added oxygen, any silicon dioxide removed during the sputter-tech cleaning is re-formed on the surface of the silicon carbide prior to the deposition of the glass.

The ultra-low-expansion glass sputtering parameters will vary as a function of system size, but a general parametric range has been found to comprise:

| | |
|---|---|
| Power source type: | RF at 13.56 megacycles |
| Target to substrate spacing: | 3.8 to 5 cm diode mode and 10 to 15 cm using using a magnetron cathode |
| Cathode (target) input power: | 5 to 8 w/cm$^2$ (based on target area) |
| Voltage gradient to ground: | 2200 volts |
| Atmosphere pressure: | 10 to 15 Microns total |
| Atmosphere pressure control: | ±1% |
| Atmosphere gas composition: | 98% Argon/2% oxygen (by volume) |
| Gas composition ratio control: | ±2% |
| Gas flow rate: | Equivalent to $1.5 \times 10^{-2}$ vacuum chamber volumes/hour (based on standard conditions) and directed into the plasma field |
| Ultra-Low-Expansion glass deposition rate: | 0.5 to 2.0 Microns/hour |

EXAMPLE 7

In view of the limited availability, expense, the waste of material when making a compound 45° x-y/45° Z surface cut, and the size limitations of the carbon-carbon materials used in Examples 2–6, an attempt was made to improve the surface quality of the more common commercially-available carbon-carbon materials first discussed in Example 1. These studies also included using Polar Weave type carbon-carbon manufactured by the General Electric RESD Division, Philadelphia Pa. Further, the work included the carbonized cementing of a thin carbon cloth layer to the surface of polar weave material which in turn was filled with a carbonized matrix material containing finely chopped carbon fibers.

In accordance with process developments made for us by the General Electric RESD Division in Philadelphia, Pa. the following process was adopted to minimize and limit the formation of thermal cracks around and within carbon fiber bundles in the carbon-carbon materials. Prior to the carbon-carbon pitch impregnation and densification cycles, the preform was infiltrated with pyrolytic carbon, using a chemical vapor deposition process. This was followed with multiple pitch impregnation-bake cycles at 100 MPa. Processing of selected substrates in this manner reduced thermal strain mismatch between the fiber direction and transverse directions of the composite bundles.

The dimensional stability of carbon-carbon substrates prepared in this manner was very favorable. Exposure to heat treatment temperatures of 1680° C. following carbonization at 1400° C. introduced no significant dimensional change; likewise, immersion into liquid nitrogen (−196° C.) resulted in no significant changes. Extended exposure to high relative humidity (100 percent) indicated no significant weight gain and no significant dimensional changes.

Following carbonization of the substrate preforms, the surface of the preforms was prepared by filling residual surface pinholes, craters, or cracks with a cement formulation compatible with the carbon-carbon material. One acceptable formulation consisted of 2-Micron Dixon graphite particles in a furfuryl alcohol and malic anhydride binder. After application of the formulation to the surface, the excess was "doctor-bladed" away. The preform was then allowed to air dry cure for 16 hours at 130° C. to 180° C. and followed by pre-carbonization at 600° C. and complete carbonization of the cement resin at about 1100° C.

To bind together the original carbon-carbon and the cement filler, and to harden and strengthen the surface, the substrate was infiltrated with pyrolitic carbon for 24 to 40 hours using a chemical vapor deposition process involving the chemical cracking of methane at 1100° C. and 2 mm HG absolute pressure. Following cooling, any ridges which appeared and any excess cement filler was polished from the surface with 1200 grit Al$_2$O$_3$ using conventional optical surface polishing procedures. After polishing, the substrate was submersed in a sonic bath of trichloroethane to remove any loose carbon and the Al$_2$O$_3$ slurry. During cleaning, the substrate was inverted to aid in the release of any trapped particles.

Electroless nickel was applied directly to the prepared surface of a carbon-carbon substrate 14. The electroless nickel did not satisfactorily adhere to the prepared carbon-carbon material 14. However, good electroless nickel adherance resulted when the carbon-carbon substrate surface 14 was provided with bonding layers of silicon carbide 16 and silicon dioxide 18 as with the teachings of Example 2.

EXAMPLE 8

A substrate of carbon-carbon, prepared as in Example 7, was coated directly with electrolytic copper, without the desired adherence to the substrate 14. However, good electroless copper adherance resulted when the carbon-carbon substrate surface 14 was provided with bonding layers of silicon carbide 16 and silicon dioxide 18 in accordance with the teachings of Example 3.

EXAMPLE 9

Substrates of carbon-carbon prepared as in Example 7, were successfully sputter coated with ultralow-expansion, modified fused-silica glass using parameters described in Example 6.

Following optical polishing, these samples successfully withstood the severe tape-pull and thermal shock tests discussed in Example 6. Limited tests to evaluate sensitivity to temperature and humidity cycling were conducted. Several small samples were optically examined prior (to and following) the above described thermal shock testing, and prior to (and following) 72 hours exposure to 100 percent relative humidity. An examination of the results showed no significant changes in optical surface quality attributed to test exposure.

EXAMPLE 10

A substrate of carbon-carbon, prepared as in Example 7 and coated with silicon carbide/silicon dioxide was plated with ultralow-expansion glass, using conventional ion plating techniques. The feasibility of this technique was demonstrated on samples having a diameter less than 2.5 cm.

An attractive feature of ion plating is that deposition rates as high as 60 microns/hour appear possible. The intrinsic film stress can be controlled (compressive to tensile) and the coefficient of thermal expansion varied from $+0.5 \times 10^{-6}$ cm/cm°C. to $-9.0 + 10^{-6}$ cm/cm°C. over a temperature range of 21° to 127° C. The coefficient of thermal expansion and stoichiometric properties of the glass were found to be acceptable.

EXAMPLE 11

Substrates of carbon-carbon prepared in accordance with Example 7 and coated with chemical vapor deposits of crystalline silicon carbide 16 and silicon dioxide 18, as in Example 2, were coated with evaporative coatings of Schott #8329 glass (available from Schott Optical Glass Inc., of Duryea, Pa.). Bonding of the Schott #8329 has been demonstrated on samples in sizes to 25 cm diameter.

The coefficient of thermal expansion of Schott #8329 glass is an order of magnitude higher than that of ultra-low-expansion glass and carbon-carbon. In very high thermal flux applications, this factor may limit the potential uses of mirrors coated with this glass. However, it is thought that mirrors produced with the evaporative Schott #8329 glass coating will prove satisfactory for many low thermal load applications. Further, carbon-carbon substrates coated with Schott #8329 glass have withstood extremely high thermal and humidity shock imposed by being subjected to saturated "live-steam" testing for about 4 hours. These samples have also withstood immersion into liquid nitrogen ($-196°$ C.), subjection to a $-15°$ C. deep freeze, and oven-baking at $+149°$ C.

EXAMPLE 12

A substrate of carbon-carbon prepared in accordance with Example 7 was further prepared by filling residual imperfections in the substrate prior to coating of the prepared surface. Following suggestions of the RESD Division of General Electric in Philadelphia, Pa., the carbon-carbon substrate preforms were successfully filled with a finely dispersed slurry of Beta Eucryptite ($Li_2O.Al_2O_3.2SiO_2$). The negative coefficient of thermal expansion for the Beta Eucryptite was useful because the filling material was not extruded from the filled openings during subsequent heating of the substrate.

Openings in the surface of carbon-carbon substrates were filled with Beta Eucryptite by alternately using isopropanol or isopropanol-acetone mix as a carrier liquid and applying it with a fine camel hair brush. After air-drying, the surface was re-wetted with acetone, rapidly drained and re-dried. The Beta Eucryptite filling and acetone re-wetting procedures were repeated until "swirl-patterns" of Beta Eucryptite particles in the carrier liquid indicate no further flow of Beta Eucryptite particles into the cracks. After a final drying, the surface was brushed to remove any loose Beta Eucryptite particles and painted with a layer of furfuryl alcohol to "glue-in" the Beta Eucryptite and to form a carbonized binder during subsequent heating/carbonization to 1100° C. Following this Beta Eucryptite filling process and the carbonization step, the surface of the substrate was again infiltrated with pyrolytic carbon for about 80 hours, to further fill any residual cracks, to bind together the Beta Eucryptite with the pyrolytic carbon and to harden the surface. This surface-hardening imparted surface strength which duplicated the higher strength property of "a-a" and "b-b" carbon fiber planes that was acquired when cutting a conventional 3-D carbon surface on a compound 45° x-y/45° z plane as discussed in Example 4.

A thin layer (2000 Angstroms) of silicon carbide was sputtered onto this improved carbon-carbon substrate surface employing the sputtering parameters as in the previous discussion of the silicon carbide layer. Again, prior to sputtering the silicon carbide onto the prepared substrate surface, the surface of the substrate was cleaned by sputter-etching for 5 to 10 minutes. Also, the oxygen-rich sputtering atmosphere enhanced the formation of silicon dioxide onto the silicon carbide surface.

Following sputtering of the silicon carbide on the substrate, we attempted to directly apply electroless nickel to the silicon carbide, as in Example 2. The electroless nickel did not adhere as satisfactorily when applied to the silicon dioxide coated, crystalline-type silicon carbide formed in the chemical vapor reaction process.

EXAMPLE 13

An improved carbon-carbon substrate was both processed and then surface coated with sputtered silicon carbide/silicon dioxide as in Example 12. Next, a layer of electrolytic copper was deposited. However, the electrolytic copper did not adhere well when applied directly to the sputtered amorphous silicon carbide coated with silicon dioxide. The results were not as favorable as application of electrolytic copper according to Example 3 wherein the silicon carbide formed in the chemical vapor reaction process was of the crystalline type.

EXAMPLE 14

An improved carbon-carbon substrate was prepared as in Example 12. It was then coated with a thin ($3\times10^{-3}$ cm) crystalline layer of chemical vapor reacted silicon carbide 16 and the silicon carbide surface was oxidized to silicon dioxide 18, as in Example 2. An applied layer of electrolytic copper gave good adhesion test results and reconfirmed the need for both a silicon dioxide layer and a crystalline form of silicon carbide.

EXAMPLE 15

An improved carbon-carbon substrate was prepared as in Example 12. It was then coated with a crystalline layer of chemical vapor reacted silicon carbide 16 and the silicon carbide surface was oxidized to silicon dioxide 18, as in Example 2. Electroless nickel applied to the intermediate layer of silicon dioxide gave good adhesion results and re-confirmed the need for both a silicon dioxide layer and a crystalline form of silicon carbide.

EXAMPLE 16

An improved carbon-carbon substrate was prepared and then sputter coated with silicon carbide/silicon dioxide as in Example 12. The substrate was then primed with a thin layer of titanium (1000 Angstroms) gold (400 Angstroms). Electroless nickel applied to the primed surface demonstrated satisfactory adhesion.

EXAMPLE 17

An improved carbon-carbon substrate was processed, as in Example 12, but was coated with a crystalline layer of chemical vapor reacted silicon carbide 16 and silicon dioxide 18, as in Example 2. It was next primed with a thin ($12\times10^{-4}$ cm) deposit of electrolytic copper, in accordance with Examples 3 and 14. Electroless nickel applied to this primed surface demonstrated satisfactory adhesion.

EXAMPLE 18

Improved carbon-carbon substrates, both processed and then sputter coated with silicon carbide and oxidized to silicon dioxide, as in Example 12, were successfully sputter coated with ultralow-expansion, modified fused-silica glass, using the glass sputtering parameters described in Example 6. The samples all passed the severe tape-pull and thermal shock testing described in Example 6.

EXAMPLE 19

An improved carbon-carbon substrate both processed and then sputtered with silicon carbide/silicon dioxide as in Example 12 was coated with ultralow-expansion glass by conventional ion plating techniques described in Example 10. A sample made by the method was found to be satisfactory.

EXAMPLE 20

Several substrates of improved carbon-carbon both processed and then sputtered with silicon carbide/silicon dioxide, as in Example 12, were evaporative-coated with a layer of Schott #8329 glass. Excellent quality polished glass surfaces with good adherance were obtained. The samples were all subjected to severe thermal shock testing, to be described in detail under Example 21. It was also learned that, when employing a sputtered silicon carbide layer, less glass thickness is needed to achieve a polished specular glass surface. This is because the sputtered silicon carbide is much smoother than the rather rough "sandpaper-like" silicon carbide surface produced by the chemical vapor reaction process.

EXAMPLE 21

A 25 cm diameter substrate of polar weave carbon-carbon, whose surface was provided with a thin carbon cloth overlay filled with a matrix of finely chopped carbon fibers, was further prepared as in Example 12. The surface of this substrate was then coated with a crystalline chemical vapor reaction layer of silicon carbide 16 and the silicon carbide was oxidized to silicon dioxide 18, as in Example 2. The resulting 25 cm diameter substrate was further subjected to an oxygen rich environment, following a sputter-etch cleaning cycle and immediately prior to being coated with an evaporative coating of Schott #8329 glass, as described in Example 11. The mirror demonstrated very satisfactory attributes.

A relatively short (25 hour), low pressure (0.137 $N/cm^2$), low surface speed (38 ft/min) optical polishing operation produced a very specular optical surface. Interferometer measurements showed the optical surface was flat to within $\frac{1}{4}$ wave irregularity (peak-to-valley), measured at 6328 Angstroms. The polished glass thickness was about 60 Microns. Additional polishing would further improve the surface figure, but for this experimental mirror further polishing was not considered feasible.

Next, the mirror surface was subjected to very adverse thermal shock testing. These tests included: 100% RH at 55° C. for 1.25 hours; water bath immersion cool at 18° C. for 30 minutes; surface heating at 8.4 Kw/m² for 1 minute; heating by condensing "live-stream" (100° C.) onto the polished glass surface for 4 hours; impinging high velocity jets of "live-stream" both onto the polished surface and around the edge at the interface of the glass layer and carbon substrate; application of $-15°$ C. ice cubes to the areas contacted by "live-steam" jet immediately upon removal of the steam jet; baking the assembly in air at 150° C. for 1.75 hours; and freezing the assembly at $-15°$ C. for 3.25 hours. Following these severe environmental tests the surface adhesion was further checked by tape-pull testing at numerous positions including the edges. No failures were observed and the entire thermal testing program was repeated, in a different sequence, again without evidencing any failures.

Following the environmental thermal and tape-pull testing both the surface specularity and surface figure was remeasured. The specularity was unchanged and interferometer measurements showed no statistically identifiable change had resulted to the optical figure.

These tests confirmed that strong bonding of the glass had been achieved and that the composite mirror assembly was extremely tolerant to severe thermal shock and was stable to exceptional moisture and 100% relative humidity environments.

EXAMPLE 22

A carbon-carbon substrate was provided with a layer of crystalline silicon carbide using a conventional chemical vapor reaction. Exceptional care was taken when using the chemical vapor reaction to not reopen cracks or cause thermal degradation of the carbon-carbon substrate by the high temperature reactions.

A layer of silicon dioxide was also formed on the surface during cool-down in air, as in Example 2, but the surface was heavily contaminated with deposits of carbon soot, unreacted silicon, and other unidentified products. Preliminary tests showed that poor adhesion was being obtained for metals (copper and electroless nickel) and for glass (Schott #8329). Therefore, following this coating of the silicon carbide/silicon dixoide on the substrate, the contaminated silicon carbide/silicon dioxide surface was cleaned with hydrofluoric acid and exposed to oxygen to form a new uncontaminated layer of silicon dioxide.

The substrate was then coated with electroless nickel, as described in Example 2. As in Examples 2, 4, 7, and 15, the electroless nickel coating was applied to this cleaned silicon carbide/silicon dioxide layer, and was very adherant. This again demonstrated that good electroless nickel adherance was achieved on crystalline silicon carbide with a monolayer of silicon dioxide.

EXAMPLE 23

A carbon-carbon substrate was coated with silicon carbide using a conventional chemical vapor reaction and the surface was re-cleaned and oxidized as in Example 22. The substrate was then coated with electrolytic copper as described in Example 3. The sample produced in accordance with this method gave excellent copper adherance.

EXAMPLE 24

A carbon-carbon substrate was coated with silicon carbide using a conventional chemical vapor reaction and the surface was re-cleaned using hydrofluoric acid and oxidized as in Example 22. This surface was then sputter coated with ultralow-expansion, modified fused-silica glass using parameters described in Example 6. The resulting samples were of high quality and passed both the tape-pull and thermal shock tests discussed in Example 6.

EXAMPLE 25

A 25 cm diameter polar weave substrate was prepared basically as in Example 7, coated with a chemical vapor reaction deposit of silicon carbide and silicon dioxide and then cleaned with hydrofluoric acid and re-oxidized in accordance with Example 22. This treated substrate was provided with a coating of Schott #8329 glass, using evaporative coating as in Examples 11 and 21. The coating was optically polished, following which a second evaporative coating of Schott #8329 glass was applied. Prior to applying the second coating, 50% of the surface was primed with a 200 Angstrom layer of titanium dioxide to determine whether this might improve the bonding of the second layer of glass to the polished first layer. It was learned that good adherance resulted over 100% of the surface and that it is not necessary to prime a previously polished Schott #8329 glass surface before evaporating a second glass layer onto the first. The resulting 25 cm diameter polished mirror was satisfactory and successfully survived the kinds of thermal shock and tape-pull tests described in Example 21. It was again shown that we had learned and demonstrated a process for achieving high bond strength of glass to carbon-carbon, for making composite mirrors that are tolerant to adverse moisture environments and to very high thermal shock.

We claim:

1. A mirror comprising a carbon-carbon substrate supporting an adherent optical coating of high reflectivity.

2. A mirror as set forth in claim 1 wherein said carbon-carbon substrate comprises three-dimensional woven carbon.

3. A mirror as set forth in claim 1 wherein said optical coating comprises a metal cladding having an optically reflective surface.

4. A mirror as set forth in claim 1 wherein said optical coating comprises a glass having an optically reflective surface.

5. A mirror for high thermal energy applications comprising:
   (a) a carbon-carbon substrate; and
   (b) a high reflectivity optical coating bonded to said substrate.

6. A mirror as set forth in claim 5 wherein said carbon-carbon substrate comprises three-dimensional woven carbon.

7. A mirror as set forth in claim 5 wherein said optical coating comprises a metal cladding having an optically reflective surface.

8. A mirror as set forth in claim 5 wherein said optical coating comprises a glass having an optically reflective surface.

9. A mirror for high thermal energy application comprising:
   (a) a carbon-carbon substrate;
   (b) an optical coating of high reflectivity;
   (c) means adhering said optical coating to said substrate.

10. A mirror for high thermal energy applications comprising:
    (a) a woven three-dimensional carbon-carbon composite substrate;
    (b) a layer of glass supported by said substrate; and
    (c) a layer of material of high reflectivity adhered to said layer glass.

11. A mirror as set forth in claim 10 further comprising means for adhering said layer of glass to said substrate.

12. A mirror as set forth in claim 10 further comprising a layer of silicon carbide adhering said layer of glass to said substrate.

13. A mirror as set forth in claim 10 wherein said layer of glass comprises a layer of ultra-low-expansion glass.

* * * * *